Nov. 26, 1968   P. R. KANTOR   3,412,677

DAMPENING CONTROL MEANS FOR PHOTO-OFFSET LITHOGRAPHY PRESS

Filed Sept. 17, 1965   3 Sheets-Sheet 1

INVENTOR
PAUL R. KANTOR
BY
Meyer Baldwin, Doran & Egan
ATTORNEYS

Nov. 26, 1968          P. R. KANTOR          3,412,677
DAMPENING CONTROL MEANS FOR PHOTO-OFFSET LITHOGRAPHY PRESS
Filed Sept. 17, 1965                        3 Sheets-Sheet 3

INVENTOR
PAUL R. KANTOR
BY
Meyer, Baldwin, Doran & Egan
ATTORNEYS

United States Patent Office 3,412,677
Patented Nov. 26, 1968

3,412,677
DAMPENING CONTROL MEANS FOR PHOTO-OFFSET LITHOGRAPHY PRESS
Paul R. Kantor, Cleveland, Ohio, assignor to Kantor Press Kontrols, Inc., Cleveland, Ohio, a corporation of Ohio
Filed Sept. 17, 1965, Ser. No. 488,030
5 Claims. (Cl. 101—148)

ABSTRACT OF THE DISCLOSURE

A dampener control system for a photo-offset lithographic printing press which is operative to sense and monitor the presence of dampening solution in the dampener for the press as said solution is transferred to the printing plate. The control system is capable of detecting the dampening solution and to provide a control signal which is related to the quantity of solution detected and which signal changes in accordance with a change in the solution whereby the source of the dampener solution may be variably regulated to provide the proper amount of dampener solution so as to maintain the optimum ink-to-dampener solution balance for the press.

---

This invention relates generally to photo-offset lithography and more particularly to dampening control means especially designed for use in an offset press to provide for and maintain optimum moisture to ink balance on the printing plate during the offset printing cycle.

As is well known in the art, offset printing or more properly photo-offset lithography is possible because of the fundamental chemical principle that grease and water do not readily mix.

Offset printing is a planographic method of printing in that it utilizes a printing plate whereby the image or printing area is normally on the same level with the non-printing area, that is to say the printing area is neither cut below nor raised above the surface of the non-printing areas of the plate.

Generally speaking, the printing plate has the image to be printed, formed or applied to the plate by any suitable means such as a photographic process, typing, drawings, etc., whereby the image is ultimately developed on said plate by use of a greasy or fatty ink.

The plate may be a thin sheet of metal or paper and is usually treated by suitable chemical and mechanical processes known in the art so that its surface will readily retain a thin film of applied moisture.

Basically the printing plate as prepared for an offset printing application contains two separate and distinct areas on its surface, the first being the image or printing area composed as above mentioned of a greasy or fatty ink, and the second the clear or non-printing area.

The greasy image area is intended to be receptive to printing ink but will repel water whereas the clear area of the plate when previously dampened with a suitable water-bearing solution repels ink. The conventional dampening solution in present day use usually consists of predetermined parts of water, ammonium bi-chromate, alcohol, and gum arabic or the equivalent.

In the modern day photo-offset printing press the printing plate is attached to a cylinder identified as the plate cylinder which rotates to apply the plate image onto a rubber covered cylinder normally called the blanket cylinder. The image disposed or offset onto the blanket cylinder is a reverse or mirror image of the image on the printing plate.

By passing paper through the press so as to have the image on the blanket cylinder transferred or "offset" onto said paper, a "readable" inked image of the printing plate image is printed upon said paper.

As is well known in the art the usual photo-offset printing press has separate sources of printing ink and dampening solution which is periodically applied to the printing plate. The dampening solution and ink are likewise separately applied to the printing plate usually once during each printing cycle.

Normally when the press is initially started the dampening solution is first brought into contact with the plate so as to coat it with a thin film of moisture, the dampening solution adhering only to the non-printing or clear area of the plate and being repelled from the greasy image or printing area of said plate. Thereafter, the printing ink is brought into contact with the plate, said ink adhering to the image or printing area and repelled from the non-printing or clear area because of the presence of the moisture film thereon.

In order for the press to properly print the image formed on the printing plate the dampening solution and ink applied to said printing plate must be properly balanced with respect to each other so that the printing ink is applied to only the plate image and repelled from the clear or non-printing area of the plate. For example, if too little water is applied to the printing plate the ink thereafter applied to said plate may also adhere to the non-printing area because of the absence of sufficient moisture to repel said ink, and consequently in the next printing cycle, the image that is actually transferred to the paper will be distorted, causing what is generally referred to as "scumming" of the image which is the result of the non-printing area of the plate also printing. Hence, in order to provide for an optimum printing of the exact printing plate image onto the paper or other material media passing through the press, it is necessary to have an optimum ink-to-dampening solution balance on the printing plate per each cycle of offset printing.

Heretofore, various means have been utilized in an attempt to provide for the proper ink-to-dampening solution or water balance on the printing plate.

For example, one such attempt has been to change the rate of application of the dampening solution to the printing plate by varying the rate at which the ductor applicator or roll is brought into contact with the printing plate. Still another prior art attempt has been to provide the dampening applicator or roll, as the case may be, with means whereby the dampening solution is applied to the interior of the mechanism and is passed to the exterior thereof in predetermined minute quantities and thence applied to the printing plate.

However, said means, among various others now known to the art, have proven to be inadequate which indicates the limited effectual use of said prior control means.

In actual practice, the skill of the pressman has more often than not been the deciding factor in an effort to obtain the proper ink-to-dampening solution balance, but as the results have proven, the artisan's dexterity has not been at all adequate.

It is therefore a primary object of the present invention to provide control means especially designed to provide for and maintain an optimum ink-to-dampening solution or water balance in a photo-offset lithographic printing press.

Still another object of the present invention is to provide control means especially designed for use on a photo-offset lithographic printing press and which control means is operable to monitor and to maintain a predetermined quantity of moisture on the printing plate whereby a predetermined optimum ink-to-moisture or water balance may be maintained throughout the printing cycle.

Still another object of the present invention is to provide a novel and new control means especially designed for use on a photo-offset lithographic printing press as above defined, and which is adjustable so as to enable the press to be used to print a multiplicity of printing jobs each of which may require a different optimum quantitative ink-to-moisture or water balance.

Another object of the present invention is to provide novel control means especially designed for use on a photo-offset lithographic printing press, and which includes means to monitor or sense the presence of a predetermined quantity of dampening solution on the dampening roll of the press which may represent the optimum quantity of said solution to properly moisten the printing plate of said press to result in an optimum ink-to-dampening solution balance and in turn to provide for a highly satisfactory printing of the printing plate image, said control means also being operable to supply predetermined additional quantities of dampening solution to said printing plate if the ink to dampening solution balance may vary from its said optimum ratio.

Additional objects and advantages of the control means of the present invention will be apparent to one skilled in the art to which it pertains and upon reference to several preferred embodiments that are disclosed herein and which are illustrated in the accompanying drawings, wherein.

Figure 1:
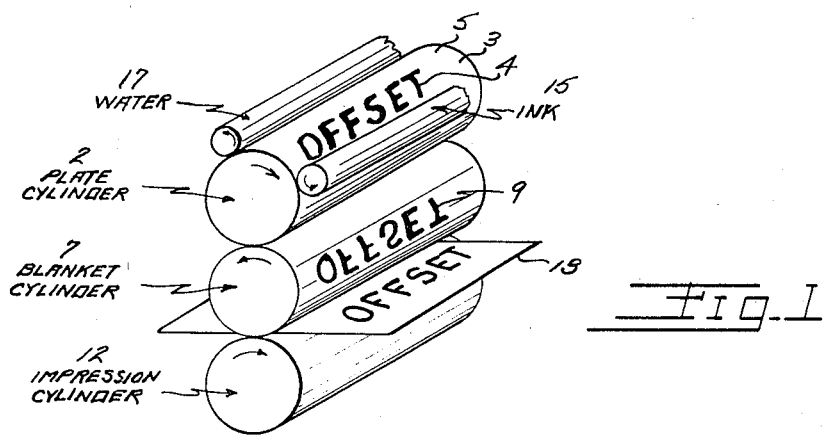
FIG. 1 is a fragmentary, schematic illustration of a typical arrangement of the several cylindrical rolls used in a conventional offset printing press.

With reference now directed to FIG. 1, a schematic assembly of a typical offset press is herein shown and is seen to include a plate cylinder, blanket cylinder and impression cylinder in a conventional arrangement. The plate cylinder as identified at 2, is seen to have a printing plate 3 mounted on its periphery and which printing plate has an image 4 comprising the word "offset" disposed thereon to define the image or printing area of said plate and also the clear or non-printing area as identified by the reference number 5.

Disposed below the plate cylinder is the blanket cylinder as identified at 7 and which, as aforementioned, is normally a rubber-covered cylinder being rotatable with the plate cylinder and in such a position as to have the image 4 transposed or "offset" in a reverse or mirror image onto its rubber surface, said offset image being shown on the blanket cylinder at 9. Similarly rotatably disposed below the blanket cylinder is the impression cylinder as identified at 12 and which is operable upon passing a sheet of paper or like printing media as indicated at 13 between it and the blanket cylinder 7 the image 9 on the latter will be transposed or printed onto said paper in a "readable" manner to thus represent an exact duplicate of the printing area 4 on the printing plate 3.

As is above mentioned, the conventional offset printing press has separate sources of printing ink and dampening solution separately applied to the printing plate 3 on the plate cylinder 2 once per each printing operation.

As seen in FIG. 1, the cylindrical roll as identified at 15 schematically represents the mechanism for supplying the printing ink to the printing plate as the same is rotated with the plate cylinder, said plate being periodically brought into engagement with said inking roll 15, thus occurring once per each printing operation.

In like manner, the cylindrical roll as identified at 17 is schematically representative of the dampening mechanism which is operable to apply a predetermined quantity of dampening solution to the printing plate 3 as the same is rotated with the plate cylinder.

As will be hereinafter described in detail, the dampening control means of the present invention is operable to monitor or sense a predetermined quantity of dampening solution within the dampening mechanism 17 whereby the amount of dampening solution applied by said dampening mechanism to the printing plate 3 may be accurately regulated so as to obtain an optimum ink-to-dampening solution balance for any specific printing operation.

Figure 2:
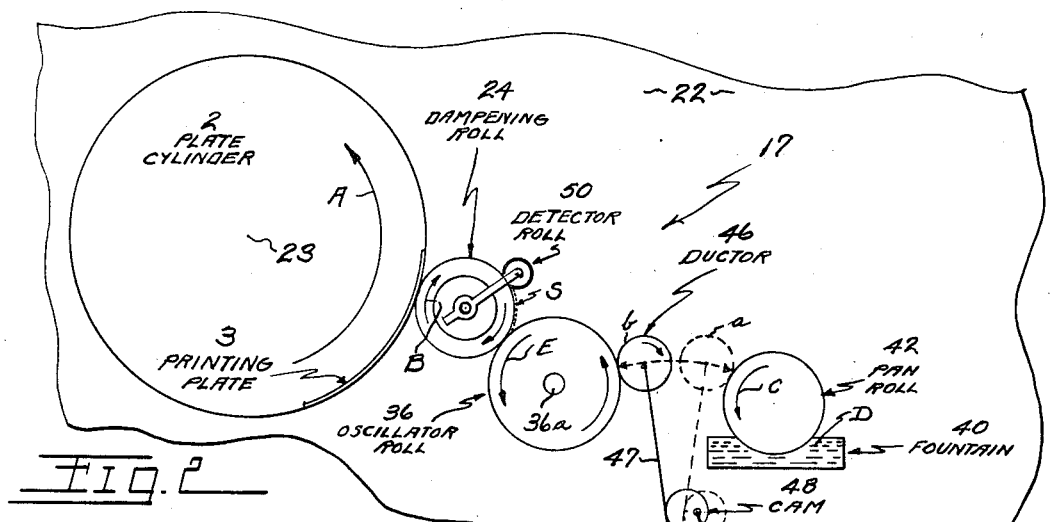
FIG. 2 is a fragmentary side view of a typical offset printing press illustrating the moisture detector means incorporated in the present invention in position on the dampening roll.
Figure 7:
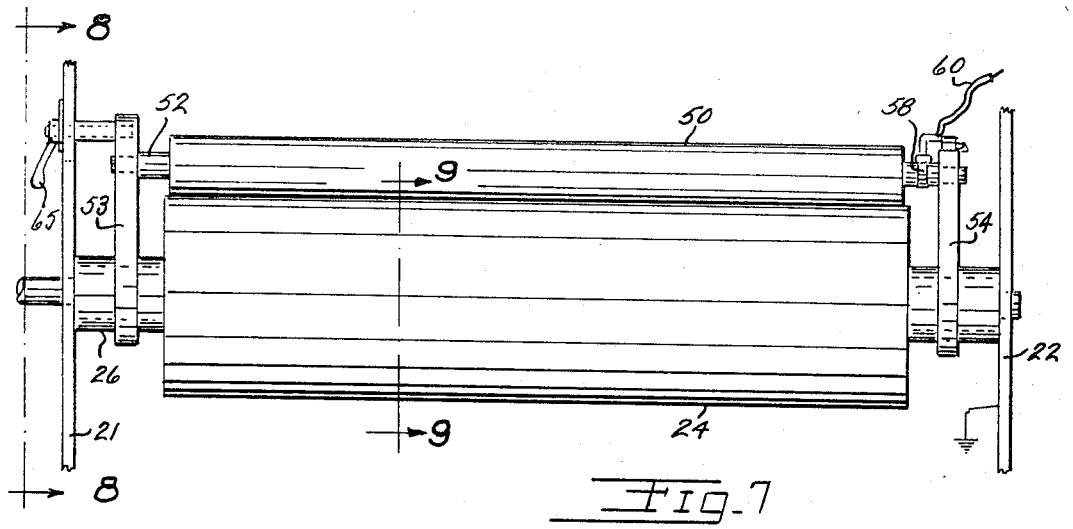

With reference now directed to FIGS. 2 and 7, there is herein shown in somewhat greater detail the dampening mechanism as identified in its entirety by the reference numeral 17 of a conventional offset printing press such as of the type disclosed in the well known publication "Photo Offset Fundamentals" by John E. Cogoli, copyrighted 1960, and which is operable in the typical printing press to provide the dampening solution to the printing plate.

The plate cylinder 2 is seen to have a printing plate 3 mounted on its periphery so as to be rotatable therewith within the press frame represented by upright plates 21, 22, about the horizontal plate axis 23, the direction of rotation being counterclockwise as is shown by the arrow A.

A dampening roll 24, as is commonly referred to, is likewise rotatably mounted within the frame 21, 22 to be in contact with the surface of the printing plate 3 as the latter is carried therepast by the plate cylinder 2 so as to transfer dampening solution from said roll to the non-printing or clear surface area of the printing plate 3. The dampening roll 24 is intended to rotate in a clockwise direction as seen by the arrow B.

Figure 9:
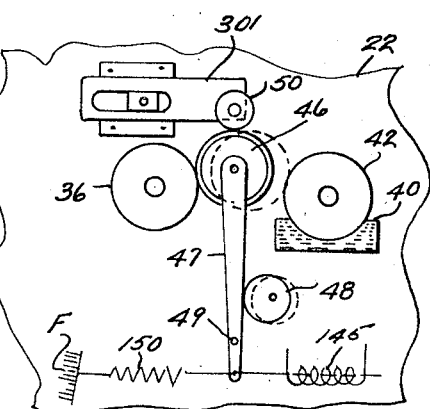
FIG. 9 is a sectional view taken on the line 9—9 of FIG. 8.

The dampening roll 24, as best seen in FIGS. 7 and 9, has a central cylindrical core 25 formed of any suitable nonconductive material such as rubber, and which is mounted on a shaft 26 supported in frame 21, 22.

A moisture holding sleeve-like covering, as identified at 28, may be placed over the central core 25, the covering used in present day presses being formed of Molleton fabric or more recently parchment paper.

The moisture holding cover 28 is insulated by the rubber core 25 from the shaft 26 and hence the press frame 21, 22.

It has also been determined in actual practice that the dampening roll 24 may be used without the need of the covering 28 thereon and has been found to retain a sufficient film of moisture on its outer rubber surface 25a for delivery to the printing plate 3 thus enabling an optimum ink-to-dampening solution balance to be maintained during the printing cycle. In this latter instance, the rubber core 25 is sufficient to insulate said film of moisture from the shaft 26 and press frame.

The dampening roll 24 is rotatably supported by its shaft 26 within the press frame members 21, 22 so as to position said covering 28 or the rubber surface 25a thereof to rollably engage the printing plate 3 as said plate is rotated with the plate cylinder 2.

An oscillator roll 36 formed of metallic material is similarly rotatably mounted by its shaft 36a within the press frame members 21, 22, so as to be in engagement with the dampening roll 24 (covering 28 or surface 25a thereof) on the side generally opposite the plate cylinder 2. The oscillator roll is intended to be rotatably driven by any conventional drive means known to the art in a counterclockwise direction as indicated by the arrow E.

The dampening mechanism 17 is also seen to include a suitable container commonly referred to as the water or dampening solution fountain 40 in which a pan roll 42 is likewise rotatably mounted in the press frame members 21, 22 and partially immersed within the dampening solution D deposited in the fountain 40 and when rotated by any suitable conventional drive means in counterclockwise direction as indicated by the arrow C, picks up dampening solution on its outer surface.

The conventional offset press assembly also includes what is normally referred to as the ductor roll as indicated at 46 swingably supported by pendulum arm 47 about an axle 49 within the press frame so as to be alternately swingably moved into engagement with the surface of the oscillator roll 36 and the surface of the pan roll 42, said ductor roll being freely rotatably mounted on its swingable suspension.

As is well known, the ductor roll 46 is the transfer element which is operable to transfer dampening solution from the pan roll 42 to the oscillator roll 36. For example, as seen in FIG. 2 when the ductor roll 46 is moved to its position as shown at a, it is moved into engagement with the pan roll 42 and rotatable thereby in a clockwise direction so as to receive dampening solution thereon from said pan roll.

In like manner, when the ductor roll 46 is moved to its dotted line position b, it engages the surface of the oscillator roll 36 so as to transfer dampening solution onto the surface of said oscillator roll 36.

In the conventional offset press, as is well known, the ductor roll is swingably actuated per each printing cycle of the press so as to provide a predetermined cyclic transfer of moisture from the pan roll 42 to the oscillator roll 36 depending upon the speed of the press.

With the oscillator roll 36 in engagement with the dampening roll 24, a portion of the dampening solution previously deposited on said oscillator roll 36 is transferred thereby to the surface of the dampening roll. In like fashion, a portion of the dampening solution deposited onto the surface of the dampening roll 24 (covering 28 or surface 25a) is, in turn, transferred thereby onto the surface of the printng plate 3, said dampening solution adhering to the clear or non-printing areas thereof.

In actual practice, it has been found that for a prearranged frequency of oscillation of the ductor roll 46, rotational speed of the oscillator roll 36 and dampening roll 24, said oscillation and roll speed depending in present day presses upon the speed of the press drive, a predetermined quantity of dampening solution is transferred by the above described dampener transfer mechanism onto the printing plate 3.

It has been further determined in actual practice that with the elements of the above described dampening mechanism operating at a preselected oscillatory and rotatable velocity and with the press performing a printing operation said dampening mechanism quickly becomes substantially stable in that a predetermined quantity of dampening solution is applied to the printing plate 3 per each revolution of the said plate and dampening roll and a predetermined quantity of said solution is picked up by the ductor roll 46 and introduced to said transfer mechanism, said ductor roll thus being in effect the input of the dampening solution mechanism and the dampening roll 24 being the output of said mechanism.

With the above elements of said mechanism being rotatable and in contact with each other as shown herein, dampening solution tends to spread evenly over the surface of each of said rolls.

Likewise, with said mechanism being substantially stable, a predetermined quantity of dampening solution is present during the stable period on each of said elements—ductor roll 46, oscillator roll 36 and dampening roll 24—of said dampening mechanism.

Now, when the printing operation of the press is temporarily interrupted for example by stopping the passage of the printing paper and/or the rotation of the printing plate 3, and if the dampening mechanism is permitted to continue its operation, dampening moisture builds up within the dampening mechanism causing what is sometimes referred to in the art as "flooding". Thereafter, when the press is restarted, the ink is washed out resulting in very poor printing results.

The same result occurs when the atmospheric conditions in the printing press area change, that is to say when the humidity increases a proportionate increase is experienced in the quantity of solution in the dampening mechanism. In like manner, if the humidity subsequently decreases to a point below that level realized at the interval the dampening mechanism previously became stable, said mechanism experiences a loss of moisture to the atmosphere so that the mechanism reestablishes a stable condition at a relatively lower moisture level. If the moisture level becomes too low, scumming occurs as aforementioned which likewise causes very poor printing results. And, for a predetermined "moisture level" on the dampening roll 24 it has also been determined that there is a consequent and predetermined moisture level provided on the printing plate 3. Likewise, it has been found that if the transfer of dampening solution by the ductor roll 46 is lessened or increased, that such differential change in the moisture thus transferred can be detected or monitored proportionately at any element in the dampening mechanism.

Having determined that there is a direct relationship at only one instant after stabilization between the moisture level on the printing plate 3 and the moisture level on any of the moisture transfer elements in the dampening mechanism—ductor roll 46, oscillator roll 36 and dampening roll 24 or the equivalent thereto in the dampener mechanism—it is then possible to use the moisture or wetness level of any one of several of said transfer elements and correlate this level to its corresponding moisture or wetness level on the surface of the printing plate 3 and to thereafter use this moisture or wetness level on said selected element(s) to provide an indication of the moisture level on said printing plate surface.

For example, in the present day offset printing press operation, the pressman normally manually sets up his press to arbitrarily deliver a preselected quantity of ink and dampening solution to the printing plate 3.

He keeps adjusting the feed of the ink and dampening solution mechanism 15 and 17 respectively until the printed output of the press appears in his artisan opinion to be properly balanced and produces a satisfactory job.

Thereafter, the pressman attempts to maintain this balance by periodically adjusting the feed of the ink and dampening solution mechanism if he finds it necessary.

At this instant, if the moisture or wetness level on any one or several element(s) in said dampening mechanism is determined, the moisture feed of said mechanism can then be required to deliver whatever quantity of dampening solution to the input of said mechanism capable of maintaining this balance.

The automatic dampening control means of the present invention functions to accomplish this purpose, and with reference directed now particularly to FIGS. 2, 4, 5 and 7, a preferred embodiment of said control means will now be described.

A cylindrical roll, hereinafter defined as a detector roll 50, being formed of a suitable conductive material such as stainless steel is rotatably mounted in the press frame 21, 22 in contact with the surface of the dampening roll 24.

As best seen in FIG. 7, the detector roll 50 is carried on stub shaft 52 which may be formed integrally with said roll, and which, in turn, is suitably rotatably supported within end plates 53, 54.

End plates 53, 54 are each constructed of a suitable nonconductive material such as plastic, each of which is loosely mounted upon the adjacent end of the shaft 26 of the dampening roll 24 preferably spaced between the press frame 21, 22 and the adjacent roll ends so as to enable said roll to freely rotate with the printing cylinder 2.

Said end plates 53, 54 thereby insulate detector roll 50 from the press frame 21, 22.

A slip ring or resilient finger 58 formed of a suitable conductive material such as copper mounted on plastic end plate 54 is in conductive contact with the stub shaft 52 while permitting the detector roll 50 to freely rotate.

A conductor 60 has its one end connected to slip ring 58 so as to be in conductive relation with said detector roll 50.

Figure 5:
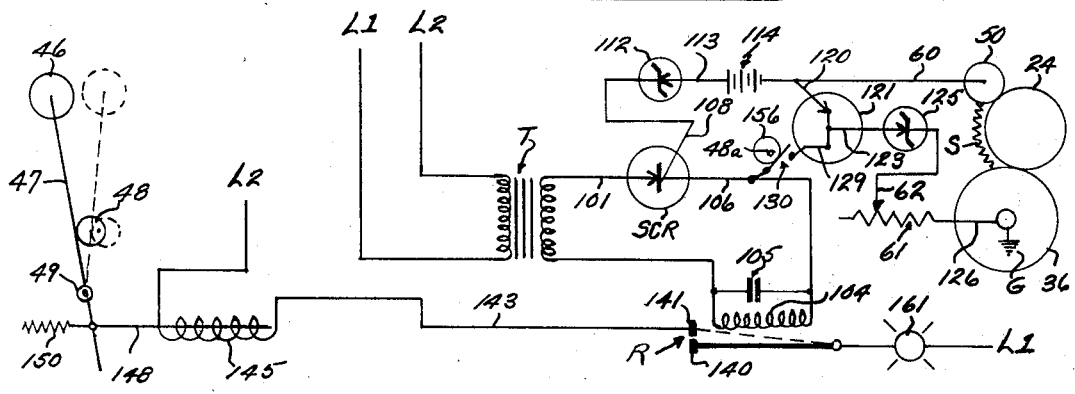
FIG. 5 is a schematic wiring diagram of one form of electric circuit control means incorporated in the present invention and which may utilize the detector means of either FIGS 2 and 3.

The opposite end of conductor 60, as best seen in FIG. 5, is included as a part of the electronic circuit means of the instant control.

Figure 8:
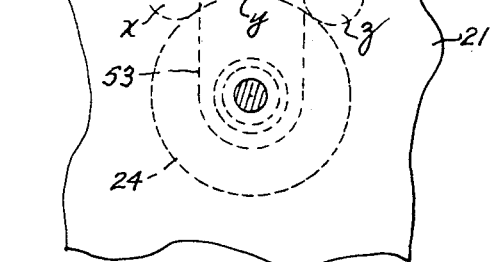
FIG. 8 is an end view of the detector roll assembly showing its adjustable mounting looking in the direction of the arrow 8—8 in FIG. 7.

As best seen in FIGS. 7 and 8, an adjusting screw 65 is disposed within arcuate slot 66 formed in frame plates 22 and is threadedly connected with plastic end plate 53 whereby the detector roll 50 may be adjustably moved about the periphery of the dampening roll 24 and locked in said adjusted position such as for example positions $x$, $y$ or $z$ as shown in FIG. 8.

Figure 4:
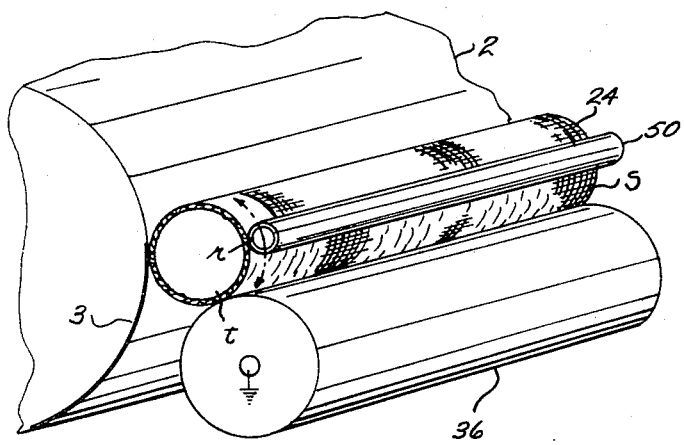
FIG. 4 is a schematic fragmentary perspective view of an offset press showing the detector roll in the dampening control of the present invention in engagement with the dampening roll of the press to show the concept of sensing or monitoring of a predetermined quantity of dampening solution on the surface of the dampening roll.

With reference directed to FIG. 4, the surface of cylindrical detector roll 50, as will be understood, is in line-to-line contact at line $r$ with the surface of cylindrical dampening roll 24, and in the instant assembly said line-to-line contact extends across substantially the entire length of the roll 24.

Spaced about the periphery of the dampening roll 24 at line $t$ thereon, the oscillator roll 36 is also in line-to-line contact with the surface of said dampening roll 24.

The arcuately defined area between lines $r$ and $t$ about the periphery of said roll thus described and indicated by the shaded area S on the surface of the dampening roll 24 identifies a predetermined quantity of dampening solution on the surface of said dampening roll 24 transferred thereto by oscillator roll 36.

As previously mentioned, the dampening solution is normally formed of a water base and predetermined parts of gum-arabic solution, ammonium bi-chromate and on occasion alcohol. This solution has a finite value of resistance which can be detected, the resistance value depending upon the solution mixture and the quantity of solution that is included between the contacting rolls 50 and 36.

For example, one mixture of dampening solution having one gallon of water, one ounce of gum arabic solution, and one ounce of ammonium bi-chromate +20% alcohol has been found to have a consistency capable of providing a finite value of resistance of approximately 2500 ohms on an offset press dampening roll ten inches in length.

As is understood in the art, water is a relatively poor conductor and by adding preselected quantities of ammonium bichromate, the combined solution is electrolytic in its characteristics whereby as greater quantities of said element are added into solution with the water base a resulting increase is realized in the presence of hydrogen ions to provide said solution with a related decreased resistance value. Consequently, any desired density of electrolytic solution and hence magnitude of solution resistances may be obtained by adding predetermined parts of ammonium bi-chromate among others known in the art to a water base.

With the detector roll 50 engaging the surface of the dampening roll 24 along line 4 as seen in FIG. 4, and the oscillator roll 36 engaging said roll along line $t$, the quantity of the layer of dampening solution therebetween, as identified at S, represents a predetermined finite ohmic value which electrical quantitative value can be monitored or detected and measured and hence used to regulate the actuation of the dampening mechanism 17 for applying additional dampening solution to the printing plate.

To accomplish this, reference is now directed to FIG. 5 wherein is illustrated one configuration of electronic control circuit that is incorporated into the dampener control of the present invention, and which is intended to be connected to a suitable conventional source of alternating current (not shown) such as 110 volts AC by the line conductors $L_1$ and $L_2$.

Line conductors $L_1$, $L_2$ in turn, connected to the primary winding of a suitable conventional step-down transformer T, one side of the secondary winding of which is connected to the anode electrode 101 of a silicon controller rectifier (SCR) and the opposite end to one end of the coil 104 of a voltage sensitive relay R. The opposite end of the relay coil 104 is connected to the cathode 106 of the (SCR), and a capacitor 105 is seen to be connected across coil 104, the purpose of which will be hereinafter explained.

The step-down transformer T may be of the type having a voltage input on its primary winding of 110 volts AC and an output voltage on its secondary winding of approximately 24 volts AC.

The gate electrode 108 of the (SCR) is connected to the anode of a conventional Zener diode 112, the cathode 113 of said diode being connected to the positive (+) terminal of a suitable source of direct current such as a 9 volt battery as indicated at 114. The negative (−) terminal of battery 114 is connected, in turn, to the detector roll 50 by the aforesaid conductor 60, the latter also connecting to the emitter electrode 120 of transistor 121, which, in the instant circuit is a conventional PNP transistor.

The base electrode 123 of transistor 121 is connected to the cathode of a second Zener diode 125, reverse connected to act as a low resistance, the anode of said diode connecting, in turn, to the adjustable arm 62 of rheostat 61. The rheostat resistance is connected by conductor 126 to the oscillator roll 36 which is grounded to the press frame at G.

To complete the transistor circuitry, the collector electrode 129 of transistor 121 is connected to one side of a conventional single-pole, single-throw switch 130, the movable contact of said switch connecting to the junction of the cathode 106 of the aforementioned (SCR) and the coil 104 of relay R.

As will later be obvious the switch 130 may be omitted and the collector electrode 127 then connected directly to the junction of the coil 104 and cathode 106 of the (SCR). The transistor 121 is thus connected in a common emitter amplifier circuit as is understood.

With this circuit configuration, the quantity of dampening solution S on the dampener roll 24 is seen to be connected between the detector roll 50 at contact line $r$ and the oscillator roll 36 at contact line $t$ or in the emitter 120 base 123 circuit of the transistor 121.

The relay R is seen to have a normally-open pair of contacts (coil de-energized), the movable contact 140 (coil responsive) being connected by line conductor $L_1$ to one side of the AC source (not shown), the fixed contact 141 being connected by conductor 143 to one side of solenoid coil 145, the opposite side of said coil being connected by line conductor $L_2$ to the opposite side of said AC source (not shown).

The solenoid armature 148, as shown in FIGS. 2 and 5, is connected to the bottom end of pendulum arm 47 which, as aforementioned, supports the ductor roll 46 on its free upper end, and which, in turn, is pivoted about axis 49 intermediate its ends by cam 48 to swing the ductor roll 46 between the pan roll 42 and the oscillator roll 36.

A suitable spring or the like as indicated at 150 has its one end connected to the bottom end of pendulum arm 47 and its opposite end attached to the machine frame being thereby effective to urge said pendulum arm in a clockwise direction as seen in FIG. 2.

As is also seen in FIG. 5, the movable normally-open contact of switch 130 is preferably periodically closed by a second cam 156 carried on shaft 48a and which is rotatable therewith, cam 156 acting to close switch 130 as the ductor roll 46 is swung into engagement with the oscillator roll 36 by cam 48.

The control circuit of FIG. 5 operates in the manner as will now be explained to detect or sense the amount of dampening solution S on the dampener roll 24 and to regulate the actuation of the ductor roll 46 whereby a preselected ink-to-dampening solution balance is continuously maintained on the printing plate 5.

Assuming that the operator has initially adjusted the ink and dampening solution mechanisms 15 and 17 respectively whereby in his expert judgement the printing output is satisfactory thus indicating that the proper ink-to-dampening solution balance has been obtained for the particular printing job the control circuit is then turned on.

As aforementioned with the proper dampening solution to ink balance being obtained, the transfer mechanism 17 becomes quickly stabilized whereby a predetermined quantity of dampening solution is present on each element of said mechanism 17.

With the detector roll 50 contacting the dampener roll 46 along line contact r and the oscillator roll 36 engaging said dampener roll along line contact t, the quantity of dampening solution S on said dampening roll is connected across the emitter-base circuit of transistor 121 and, as aforementioned, said value S is a quantitative resistance value which represents the proper or optimum dampening solution to ink balance on the printing plate.

In actual practice it has been determined that the ohmic value of the dampening solution S varies directly as the distance between line contact r (detector roll) and line contact t (oscillator roll).

It has also been determined that the contacts between the detector roll 50, oscillator roll 36 and the dampener roll 24 respectively should each preferably be a line type of contact extending along the dampener roll rather than a point type of contact inasmuch as a point contact between the detector roll and/or oscillator roll and the dampener roll will provide a substantially higher value of resistance for the dampening solution therebetween.

During the cyclic interval when the switch 130 is open the transistor 121 is hence effectively cut off.

When switch 130 is closed by cam 156 which is once per revolution of shaft 48a which, in turn, in a conventional press is approximately at a cyclic rate of sixty times per minute the collector electrode 127 is periodically connected at said cyclic rate to the cathode 106 of the SCR and also to one side of the coil 104 of relay R.

Provided that the dampening solution to ink balance is the desired value, the rheostat arm 62 is adjusted until the transistor 121 is pulsed at said 60 cycle per minute rate so as to turn on sufficiently to cause the Zener diode 112 to go into its conductive range and provide a pulsed emitter current flow at said pulsed rate of such value to gate the SCR whereby said SCR turns on. As will be realized, the SCR will conduct during the interval when the upper end of the transformer secondary is positive (+) thus making its anode 101 positive with respect to its cathode 106.

In the present circuit, the SCR will turn on at approximately a rate of 60 times per second, the cyclic rate of the power source.

With the SCR turned on, current pulses through the anode-cathode circuit of the SCR are applied across the relay coil 104 and capacitor 105.

The relay R is thereby energized to close its contacts 140, 141 and in turn energize solenoid 145 whereby the solenoid armature 148 is pulled to the right as seen in FIG. 5 effective to swing the pendulum arm 47 counterclockwise and bring the ductor roll 46 to bear against the oscillator roll 36, thereby stopping the ducting of the dampening solution.

If the application of current pulses across relay coil 104 continues (one pulse per each closing of switch 130) the capacitor 105 is charged whereby during the intervening interval that the switch 130 is open, the charge on said capacitor drains off through the relay coil 104 thus maintaining the energization of said relay and the resultant retention of the ductor roll 46 in engagement with the oscillator roll 36. The time constant of capacitor 105 and relay coil 104 is greater than the interval between successive closings of switch 130.

Likewise, during this interval when relay R is energized, the cam 48 is merely rotated on its shaft 48a and is not effective to swing the arm 47 to and fro between the said oscillator roll and pan roll 42. A lamp 161 or the like may be inserted into the line conductors $L_1$ or $L_2$ connecting relay contacts 140, 141 so as to be illuminated and thus visually indicate the energization of solenoid coil 145 and that the ductor roll 46 is retained in engagement with the oscillator roll 36 thus interrupting the ducting of the dampening solution.

Thereafter, if a portion of the dampening solution on the dampener roll 24 evaporates and/or is applied to the printing plate to maintain thereon the proper dampening solution to ink balance the wetness or moisture level on said roll is correspondingly decreased whereby the remaining lessor quantity of dampening solution S on the dampener roll 24 between line contacts r and t of detector roll 50 and oscillator roll 36 respectively will result in a corresponding increase in solution resistance of the remaining solution between said line contacts r and t thereby indicating that the previously established dampening solution on said roll needed to maintain the dampening solution on the printing plate is no longer at said preset value.

In the case of the evaporation of the dampening solution, the several aforementioned components which make up said solution are believed to evaporate at a rate that corresponds to their respective specific gravity. In this instance, the dampening solution throughout the press, printing plate, transfer mechanism, etc., evaporates somewhat equally, and the corresponding increase in resistance of the remaining portion of the dampening solution S on the dampener roll 24 indicates that the reduction in wetness or moisture level is throughout the press.

In applying dampening solution to the printing plate in an effort to maintain the preselected dampening solution to ink balance during the printing cycle wherein predetermined quantities of ink and dampening solution are applied to the material to be printed and thus removed from said plate by said material, an increase is realized in the solution resistance of the remaining dampening solution S on said roll after one or more revolutions of the printing plate, and will thereby indicate that additional dampening solution must be applied to the transfer device 17 for subsequent application to the printing plate if said balance thereon is to be maintained.

When the resistance of said solution S is thus increased the current flow therethrough provides a resultant increase in negative bias on the emitter electrode 120 which is sufficiently more negative with respect to the bias level of the base electrode 123 whereby the transistor 121 becomes nonconductive.

With said transistor non-conductive the current flow to the gate electrode of the SCR is interrupted whereby to turn the SCR off (non-conductive).

As the transistor 121 and the SCR become non-conductive the solenoid coil 145 is de-energized to permit the cam 48 to again control and effect the ducting of the ductor roll 46 between the pan roll 42 and the oscillator roll 36 to carry and supply additional dampening solution to the dampener roll 24 preparatory to its application to the printing plate to thereby maintain the proper dampening solution to ink balance on said plate.

As aforesaid, the transistor 121 is a PNP transistor and is connected into the control circuit in a reverse biased condition so that its emitter electrode 120 is negative with respect to the collector electrode 127 and transistor thus operating whereby any slight change in emitter-base voltage effects a correspondingly large energy change in the collector-emitter circuit. In this manner the control circuit is highly sensitive to small changes occurring in the resistance magnitude of the dampening solution S.

As will be apparent, the transistor 121 may also be an NPN configuration and connected into the control circuit by reversing the circuit connections thereto, as will be understood.

Figure 6:
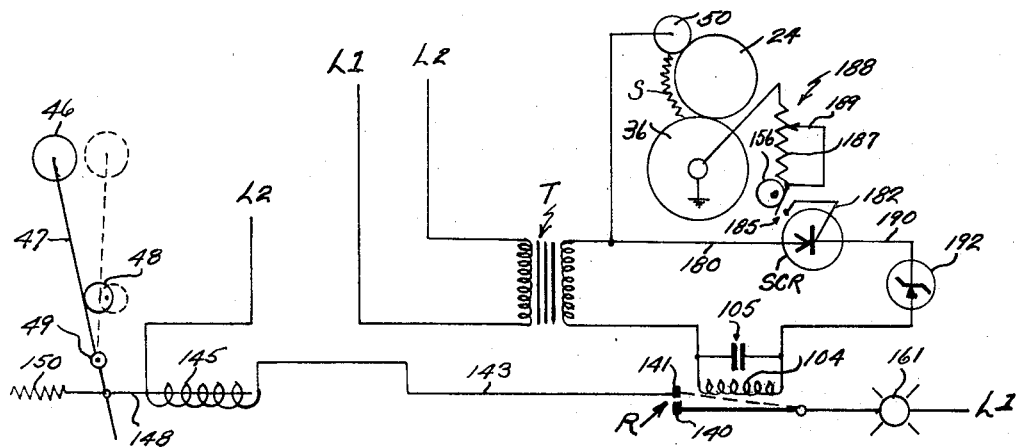
FIG. 6 is a schematic wiring diagram of a second embodiment of electronic circuit control means and which may likewise utilize either the detector means of either FIGS. 2 or 3; and, FIG. 7 is an end view of a typical offset press showing the detector roll assembly of the present invention.

In FIG. 6 a second embodiment of control circuit is herein disclosed, being somewhat simpler in its configuration, and for purposes of explanation thereof those components which compare to components in the control circuit of FIG. 5 are identified by the same reference numerals.

The modified control circuit of FIG. 6 has a silicon controlled rectifier (SCR), the anode electrode 180 of which is connected to one end of the secondary winding of transformer T. The opposite end of said winding is connected to the relay R in the same manner as shown in the circuit of FIG. 5.

The gate electrode 182 of the SCR is connected to the stationary contact of a single-pole single-throw switch 185, the movable contact of which is connected to one end of the resistor element 187 of a rheostat 188. The opposite end of said resistor element is connected to the oscillator roll 36 of the press.

The movable contact of switch 185 is positioned as to be actuated by the cam 156.

The movable arm 189 of rheostat 188 is seen to connect to said movable contact of switch 185 and is adjustable over said element 187 between the latter and the potential level of the oscillator roll 36 (ground).

The cathode electrode 190 is connected to the anode of a Zener diode 192, the cathode electrode of said diode connecting to one end of relay coil 104 of relay R. The detector roll 50 is connected by conductor 60 to the upper end of the transformer secondary in parallel with the anode electrode 180 of the SCR.

The dampening solution S on the dampener roll 24 is therefore connected in the anode circuit of the SCR, between the anode electrode and ground being thus effective to establish a potential level for said anode electrode.

With the desired dampening solution to ink balance determined in the manner aforesaid, the rheostat arm 189 is adjusted whereby with switch 185 closed during the interval the upper end of the transformer secondary is positive with respect to the lower end thereof, the SCR is gated to turn it on provided the Zener diode breakdown voltage is exceeded so as to provide energy pulses to the coil 104 of the relay R effective to close its contacts 140, 141.

As relay R is energized, the solenoid coil 145 is likewise energized so as to swing the pendulum arm 47 counterclockwise and move the ductor roll 46 into engagement with the oscillator roll 36 effective to interrupt the ducting of the dampening solution.

Thereafter, when the solution resistance of the solution remaining on the dampening roll 24 is increased in the manner aforesaid the potential level of the gate electrode is lowered sufficiently to return the SCR to a nonconductive condition. As a result, the ductor roll 46 is again capable of being oscillated by cam 48 to provide additional dampening solution to the dampener roll 36, so as to maintain the desired dampening solution to ink balance on the printing plate.

In either the control circuit of FIG. 5 or 6, if the operator desires to change the dampening solution to ink balance, he only need change the rheostat setting of rheostat 61 or 188 respectively to provide an increase or decrease in the gate signal to the gate electrode of the SCR whereby to result in an increase or decrease in the SCR output to relay R and the time interval during which the solenoid coil 145 is energized. As a result a corresponding decrease or increase in the ducting operation of the ductor roll 46 occurs to hence provide an increase or decrease in the ratio of dampening solution to ink on the printing plate and therefore a new balance of dampening solution to ink.

Figure 3:
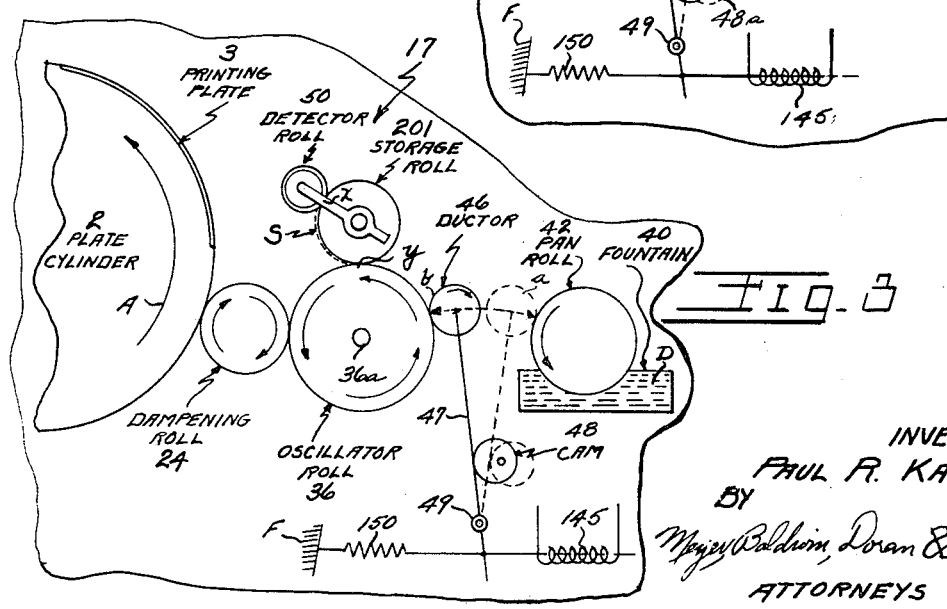
FIG. 3 is a side view of a printing press similar to that shown in FIG. 2 with a second embodiment of detector means of the present invention incorporated therein, showing said detector means in position on the moisture storage roll.

In FIG. 3, there is shown a modified assembly whereby the detector roll 50 rides upon a storage roll 201 rotatably supported within the press frame 21, 22 and which roll is usually provided in a conventional offset press to provide an additional roll surface in the transfer mechanism 17 capable of storing dampening solution thereon.

In this assembly, the quantity of dampening solution S to be sensed and monitored by the detector roll 50 is on the storage roll 201 between line contacts $x$ and $y$, the latter line contact being with the oscillator roll 36.

The storage roll 201 may be formed of the same material as that of the dampener roll 24, as previously described.

In this assembly the storage roll 201 is in axial rolling engagement with the oscillator roll 36 the latter rotating in a counterclockwise rotation so as to deposit a portion of the dampening solution onto the storage roll 201 just prior to depositing solution onto the dampener roll 24.

In this assembly, by sensing and monitoring the dampening solution S on the storage roll it provides the control circuit with additional time, as compared to sensing said solution on the dampener roll, before any change in dampening solution to ink balance is apparent on the printing plate. In this manner additional dampening solution may be applied to the transfer mechanism 17 before any noticeable change in said balance can possibly occur.

Figure 10:
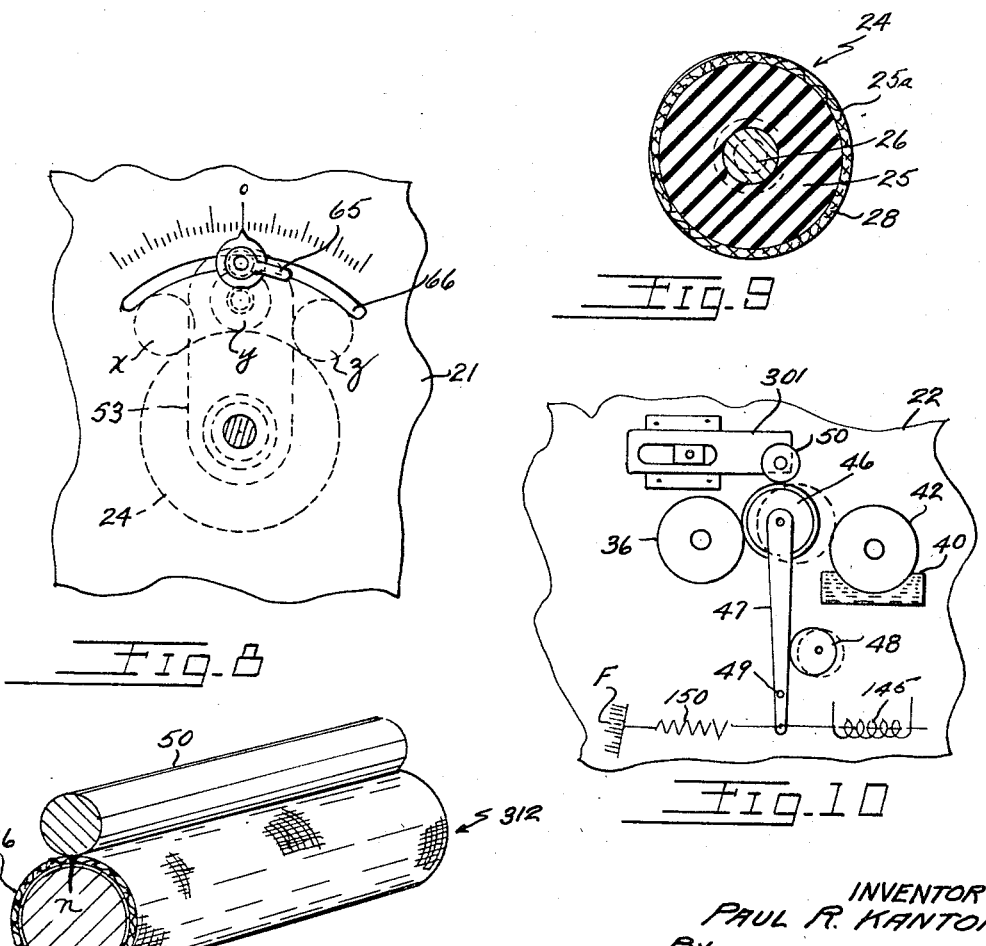
FIG. 10 is an end view of a third embodiment of detector means of the present invention.

In FIG. 10, another embodiment of detector roll assembly is herein disclosed in which the ends of the detector roll 50 are each rotatably mounted on a bar 301 which, in turn, is slidably mounted on the press frame members 21, 22 as indicated at 304.

The detector roll 50 rides upon the top of the ductor roll 46 and movable with said roll as it is oscillated between the pan roll 42 and the oscillator roll 36.

The ductor roll 46 may be metallic whereby the dampening solution S that is sensed and measured is literally the quantity of solution between the detector roll 50 and ductor roll 46 along the line contact $t$ therebetween. In this assembly, by sensing the dampening solution S on the ductor roll 46, the input to the transfer mechanism 17 a maximum period of time is permitted between sensing a change in the solution resistance and when said change will occur on the printing plate as a change in the dampening solution to ink balance. And, consequently, the control circuit has maximum time to enable additional solution to be applied to the transfer mechanism 17 before any change in the dampening solution to ink balance on the printing plate can occur.

Figure 11:
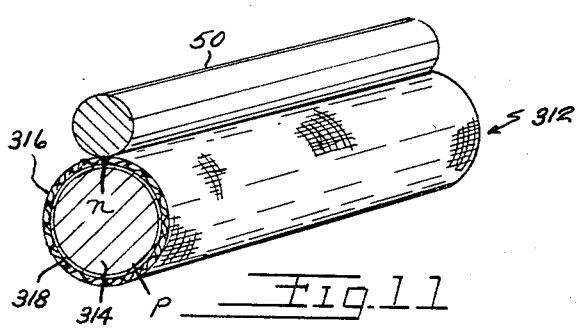
FIG. 11 is a perspective view of a modified form of detector means.

In FIG. 11 is shown a composite roll assembly at 312 which may be used as a dampener or storage roll in the transfer mechanism 17.

The roll 312 includes a rubber core 314 covered by a layer of conductive material 316 which is covered, in turn, by a layer of moisture retaining material such as molleton as indicated at 318.

In this assembly, the quantity of dampening solution lies along line contact $n$ between the detector roll 50 and the solution retained therealong in covering 318 and along line contact $p$ between said roll covering 318 and the oscillator roll 36. The solution lying along line contacts $n$ and $p$ are connected together by the layer of conductive material 316 and by the detector roll 50 and oscillator roll 36 into either control circuit of FIGS. 5 or 6 in the manner aforesaid.

Having thus described several embodiments of dampening solution control means of the present invention it will be apparent to one skilled in the art to which it pertains that various modifications, changes and combinations of elements thereof may be made without departing from the inventive concepts thereof.

What is claimed is:

1. In a lithographic press having a frame mounting a printing plate, a source of printing ink and a source of printing plate dampening solution; first roll means for applying the dampening solution to said printing plate, second roll means for applying the ink to said printing plate; at least one of said first and second roll means having a surface portion extending arcuately around the peripheral surface of the said one roll means; detector roll means electrically insulated from said frame extending along a substantial part of the said one roll means and in operative contact with said surface portion, third roll means contacting and applying fluid to said one roll means, said surface portion being non-conductive relative to said detector roll means and being defined as the surface of said one roll means which lies between the lines of contact of said detector roll means and said third roll means with said one roll means, circuit means operatively connected between said detector roll means and the said third roll means, said surface portion being a variable resistance element in said circuit, the value of which is proportional to the amount of dampening solution on said surface, said detector roll means being operable to detect the dampening solution on said surface portion and said circuit means providing an electrical signal that varies as said variable resistance varies and is representative of the dampening solution on said surface portion.

2. In a lithographic press as defined in claim 1 and wherein the circuit means includes means controllably connected to the first roll means operable to variably regulate the application of the dampening solution by said first roll means onto said printing plate.

3. In a lithographic press as defined in claim 2 and wherein the means controllably connected to the first roll means comprises motor means.

4. In a lithographic press as defined in claim 1, and wherein the detector roll means is in line-to-line contact with the surface portion of the said one roll means.

5. In a lithographic press as defined in claim 1 and wherein the first roll means includes an oscillatory ductor roll movable to and from the source of dampening solution.

References Cited

UNITED STATES PATENTS

| | | | |
|---|---|---|---|
| 1,895,125 | 1/1933 | Durham | 101—148 |
| 2,942,352 | 6/1960 | Eicken-Estienne | 324—65 X |
| 3,094,065 | 6/1963 | Roberts | 101—148 |
| 3,191,528 | 6/1965 | Jorgensen | 101—350 X |
| 3,234,871 | 2/1966 | Ostwald | 101—350 X |
| 3,274,932 | 9/1966 | Caza | 101—351 |
| 3,289,581 | 12/1966 | Roozee | 101—351 X |
| 3,301,182 | 1/1967 | Leviton | 101—351 |

ROBERT E. PULFREY, *Primary Examiner.*

E. S. BURR, *Assistant Examiner.*